(12) United States Patent
Pistidda et al.

(10) Patent No.: US 11,524,895 B2
(45) Date of Patent: Dec. 13, 2022

(54) METHOD FOR PRODUCING BOROHYDRIDE SALTS

(71) Applicant: Helmholtz-Zentrum hereon GmbH, Geesthacht (DE)

(72) Inventors: Claudio Pistidda, Geesthacht (DE); Thi Thu Le, Geesthacht (DE); Julián Puszkiel, Barcelona (ES); Klaus Horst Taube, Hamburg (DE); Martin Dornheim, Reppenstedt (DE); Thomas Klassen, Wentorf (DE)

(73) Assignee: Helmholtz-Zentrum hereon GmbH, Geesthacht (DE)

( * ) Notice: Subject to any disclaimer, the term of this patent is extended or adjusted under 35 U.S.C. 154(b) by 151 days.

(21) Appl. No.: 16/870,805

(22) Filed: May 8, 2020

(65) Prior Publication Data
US 2020/0361769 A1    Nov. 19, 2020

(30) Foreign Application Priority Data

May 16, 2019   (EP) .................................. 19174925

(51) Int. Cl.
*C01B 6/21*         (2006.01)
*B02C 17/18*        (2006.01)

(52) U.S. Cl.
CPC ............ *C01B 6/21* (2013.01); *B02C 17/1815* (2013.01)

(58) Field of Classification Search
CPC ....... C01B 6/21; C01B 32/956; C01B 32/152; C01B 32/174; C01B 32/194; C01B 3/00; B02C 17/1815
See application file for complete search history.

(56) References Cited

U.S. PATENT DOCUMENTS

| | | |
|---|---|---|
| 6,497,973 B1 | 12/2002 | Amendola |
| 6,524,542 B2 | 2/2003 | Amendola et al. |
| 6,534,033 B1 | 3/2003 | Amendola et al. |
| 6,586,563 B1 | 7/2003 | Ortega et al. |
| 6,670,444 B2 | 12/2003 | Amendola et al. |
| 7,247,286 B2 | 7/2007 | Ashby |
| 7,288,236 B2 | 10/2007 | Hauk et al. |
| 2005/0175877 A1 | 8/2005 | Hong |
| 2007/0128509 A1 | 6/2007 | Hong |

FOREIGN PATENT DOCUMENTS

| | | | |
|---|---|---|---|
| CN | 108285131 A | 7/2018 | |
| CN | 108545699 A | * 9/2018 | ............... C01B 6/21 |

OTHER PUBLICATIONS

European Search Report for EP Application No. 19174925.8, dated Nov. 26, 2019, 5 pages.
Huang, M., et al. "Efficient regeneration of sodium borohydride via ball milling dihydrate sodium metaborate with magnesium and magnesium silicide." Journal of Alloys and Compounds, 729 (2017): 1079-1085.
Lang, C., et al. "NaBH4 regeneration from NaBO2 by high-energy ball milling and its plausible mechanism." International Journal of Hydrogen Energy, 42, No. 18 (2017): 13127-13135.
Le, T.T., et al. "Efficient Synthesis of Alkali Borohydrides from Mechanochemical Reduction of Borates Using Magnesium-Aluminum-Based Waste." Metals, 9, No. 10 (2019): 1061.
Li, Z.P., et al. "Preparation of sodium borohydride by the reaction of MgH2 with dehydrated borax through ball milling at room temperature." Journal of Alloys and Compounds, 349, No. 1-2 (2003): 232-236.
Zhong, H., et al. "Sodium borohydride regeneration via direct hydrogen transformation of sodium metaborate tetrahydrate." Journal of Power Sources, 390 (2018): 71-77.

* cited by examiner

*Primary Examiner* — Steven J Bos
*Assistant Examiner* — Syed T Iqbal
(74) *Attorney, Agent, or Firm* — Marshall, Gerstein & Borun LLP

(57) ABSTRACT

The present invention relates to a method for producing tetrahydridoborate salts with high efficiency at low cost. The method for the production of metal borohydride salts according to the present invention comprises the steps of providing an anhydrous metal borate salt and milling the anhydrous metal borate salt in the presence of a metal material based on magnesium or magnesium alloys in a hydrogen atmosphere at a temperature and for a time sufficient to produce the metal borohydride salt. In another embodiment of the invention, the method for the production of metal borohydride salts according to the present invention comprises the steps of providing an hydrated metal borate salt and milling the hydrated metal borate salt in the presence of a metal material based on magnesium or magnesium alloys in an inert gas atmosphere at a temperature and for a time sufficient to produce the metal borohydride salts. In a still further embodiment of the invention, the metal material based on magnesium or magnesium alloys is a secondary magnesium material, preferably a Class 2, Class 3, or Class 6 secondary magnesium material.

18 Claims, No Drawings

METHOD FOR PRODUCING BOROHYDRIDE SALTS

CROSS-REFERENCE TO RELATED APPLICATION

The present application claims priority to European Patent Application No. 19174925.8, filed May 16, 2019, which is hereby incorporated herein by reference.

FIELD OF THE INVENTION

The present invention relates to a method for producing borohydride salts with high efficiency at low cost.

BACKGROUND OF THE INVENTION

Borohydride salts, in particular tetrahydridoborate salts, e.g. sodium tetrahydridoborate or lithium tetrahydridoborate, have been used in various industries such as pharmaceutical, chemical, and pulp and paper industries. Recently, sodium tetrahydridoborate is becoming increasingly important for use as an energy source in fuel cell and battery applications. U.S. Pat. No. 6,534,033 discloses a method using sodium tetrahydridoborate as a feed to generate hydrogen for hydrogen fuel cell. U.S. Pat. No. 6,497,973 discloses a method using sodium tetrahydridoborate as an anode in electro-conversion cell. U.S. Patent application 2005/0175877 discloses a method wherein sodium tetrahydridoborate is being used as a reducing agent for continuous regeneration of the anode in a metal-air battery system.

In prior art, sodium tetrahydridoborate is commercially produced by the "Schlesinger process", which comprises steps of: converting boric acid from reaction with methanol into trimethoxy borate ($B(OCH_3)_3$); converting sodium metal from reaction with hydrogen into sodium hydride; producing sodium borohydride from reaction of sodium hydride with trimethoxy borate. In this process, the cost of sodium metal is a major factor in the overall cost of sodium tetrahydridoborate production. Sodium is commercially prepared by electrolysis from molten sodium chloride using "Downs cell" operating at about 600° C. to about 800° C. The addition of calcium chloride to sodium chloride lowers the melting point of the mixture to 600° C. from the melting point of sodium chloride at 800° C. Due to the high operating temperature, the process is comparatively expensive.

Because of the low energy efficiency in the current commercial processes and other operational issues associated with the processes, several alternative routes to synthesize borohydrides have been studied. U.S. Pat. No. 6,670,444 discloses a method using disproportionation of diborane with small hard Lewis bases, such as sodium methoxide and sodium hydroxide, to synthesize sodium borohydride. U.S. Pat. No. 6,586,563 discloses a method using reaction of borane or diborane with base compounds, such as sodium carbonate, to synthesize sodium borohydride. U.S. Pat. No. 6,524,542 discloses a method producing boron halides, and then converting boron halides into diborane for sodium borohydride synthesis. U.S. Patent application 2007/0128509 discloses a method for synthesizing sodium borohydride utilizing a sodium-sulfur electrochemical cell flow system for sodium production. U.S. Pat. No. 7,247,286 discloses a method for synthesizing sodium borohydride from sodium aluminium hydride with recycle of byproducts.

Also for the preparation of lithium tetrahydridoborate a number of different processes have been proposed. Direct formation of lithium tetrahydridoborate from the elements is possible in principle, however it requires extreme reaction conditions (150 atm. $H_2$ pressure, 650° C.) and extraordinarily expensive apparatuses; in addition, elemental boron is not available cheaply. U.S. Pat. No. 7,288,236 discloses a method for the preparation of lithium tetrahydridoborate by reaction of lithium hydride with boron trifluoride, wherein lithium hydride is reacted with boron trifluoride in a molar ratio $LiH:BF_3$ of >4.1:1, the reaction being carried out in an ethereal solvent whose boiling point at normal pressure is at least 50° C., and at temperatures of at least 10° C.

Furthermore, the conversion of the borates of sodium and lithium using high purity $MgH_2$ to produce the tetrahydridoborate salts was reported. Li et al. "Preparation of sodium borohydride by the reaction of $MgH_2$ with dehydrated borax through ball milling at room temperature", Journal of Alloys and Compounds (2003), 349(1), pages 232-236, investigates the possibility to synthesize $NaBH_4$ by ball milling dehydrated $Na_2B_4O_7$ with $MgH_2$ in the presence of sodium-based compounds (e.g. NaOH, $Na_2CO_3$ and $Na_2O_2$). However, in view of a possible large-scale production of borohydride salts, due to the production costs associated to the use of high purity Mg $H_2$, the above-mentioned methods are not economically feasible.

The object addressed by this invention is to provide an even more efficient and economical method for the production of borohydride hydride salts.

SUMMARY OF THE INVENTION

The object is achieved by a method according to claim 1 and by a method according to claim 2. Further preferred embodiments of the invention are illustrated in the appending claims.

The method for the production of metal tetrahydridoborate salts according to the present invention comprises the steps of providing an anhydrous metal borate salt and milling the anhydrous metal borate salt in the presence of a metal material based on magnesium or magnesium alloys in a hydrogen atmosphere at a temperature and for a time sufficient to produce the metal tetrahydridoborate salt. In another embodiment of the invention, the method for the production of metal tetrahydridoborate salts according to the present invention comprises the steps of providing an hydrated metal borate salt and milling the hydrated metal borate salt in the presence of a metal material based on magnesium or magnesium alloys in an inert gas atmosphere at a temperature and for a time sufficient to produce the metal tetrahydridoborate salts.

DETAILED DESCRIPTION OF PREFERRED EMBODIMENTS

In an embodiment of the present invention the anhydrous metal borate salt is an anhydrous alkaline metal or alkaline earth metal borate salt. In another embodiment of the invention the anhydrous metal borate salt is an anhydrous sodium or lithium borate such as sodium metaborate ($NaBO_2$), sodium diborate ($Na_2B_2O_4$), sodium tetraborate ($Na_2B_4O_7$), or a mixture of the foregoing sodium salts; or lithium metaborate ($LiBO_2$), lithium diborate ($Li_2B_2O_4$), lithium tetraborate ($Li_2B_4O_7$), or a mixture of the foregoing lithium salts. Mixtures of sodium and lithium borate salts are also feasible leading to the production of mixed sodium and lithium tetrahydridoborates. In another embodiment of the invention, the hydrated metal borate salt is an hydrated alkaline metal or alkaline earth metal borate salt. In another embodiment of the invention the hydrated metal borate salt is a hydrated sodium borate such as hydrated sodium metaborate ($NaBO_2 \cdot 4H_2O$), sodium borate hydrate ($Na_3BO_3 \cdot H_2O$)), sodium tetraborate hydrate ($Na_2B_4O_8 \cdot H_2O$), borax ($Na_2B_4O_7 \cdot 10H_2O$) or a mixture of the foregoing sodium salts; or lithium metaborate dihydrate ($LiBO_2 \cdot 2H_2O$), lithium tetraborate hydrate ($Li_2B_4O_7 \cdot H_2O$), lithium tetraborate trihydrate ($Li_2B_4O_7 \cdot 3H_2O$), lithium pentaborate pentahydrate ($LiB_5O_8 \cdot 5H_2O$), or a mixture of the foregoing lithium salts.

In yet another embodiment of the invention, the method produces a metal tetrahydridoborate salt, preferably an alkali metal tetrahydroborate salt, an alkine earch metal tetrahydroborate salt, or mixtures thereof. Preferably the alkali metal tetrahydroborate salt is $NaBH_4$, $LiBH_4$ or a mixture thereof.

In yet another embodiment of the invention, prior to milling the anhydrous metal borate salt in the presence of a metal material based on magnesium or magnesium alloys under hydrogen atmosphere, the metal borate salt is dried, preferably by means of a thermal treatment at elevated temperatures, ranging e.g. from 150° C. to 400° C., e.g. from 250° C. to 350° C. In particular, the metal borate salt is dried prior to milling to convert it into its anhydrous form, in case the metal borate salt is not obtained in anhydrous form. For example, whereas lithium metaborate ($LiBO_2$) is commercially available in anhydrous form, sodium metaborate usually contains crystal water ($NaBO_2 \cdot 4H_2O$). $NaBO_2 \cdot 4H_2O$ can be transformed to its anhydrous form by thermal treatment at elevated temperatures, e.g. 250° C. to 350° C., preferably in a dry atmosphere, as other hydrous metal borates can also be transformed into their anhydrous forms by thermal treatment at elevated temperatures in a dry atmosphere. Generally, the metal borate is provided in powder form.

In a still further embodiment of the invention, the metal material based on magnesium or magnesium alloys is a secondary magnesium material. Manufacturing of magnesium products is connected with environmental problems. A large amount of waste in the form of chips and discards is produced in the machining process of castings and sheets. Approximately one third of magnesium used to fabricate structural products (castings and wrought products) ends as scrap. The enlargement of the application area of magnesium results in an increasing diversification of its alloys. Intensive alloy development efforts concerning the creep properties under consideration of corrosion resistance and die-castability are made. Several alloy compositions containing calcium, lithium, scandium, yttrium, zirconium or rare earth elements (gadolinium, dysprosium, strontium, cerium, neodymium) are known. The different categories of secondary magnesium material are listed in following Table:

| Scrap | Characterization |
| --- | --- |
| Class 1A | High grade clean scrap without impurities e.g. scrap castings, biscuits etc. |
| Class 1B | Clean scrap with a high surface in proportion to the weight |
| Class 2 | Clean scrap with aluminium- or steel inserts. No copper- or brass impurities. |
| Class 3 | Clean, dry and uncontaminated turnings and swarfs |
| Class 4 | Flux free Residues eg. dross, sludge |
| Class 5 | Painted or coated scrap with/without aluminum- or steel inlays. No copper- or brass-impurities |
| Class 6 | Oily and/or wet turnings and swarfs |
| Class 7 | Unclean and contaminated metal scrap e.g. post consumer scrap, may contain: silicon (Al-alloys, shot blasting), Cu contaminated alloys, iron inserts, Ni-coating, non-magnesium sweepings |
| Class 8 | Flux containing residues from Mg-Recycling (Mg-content <30 wt. %) |

In a still further embodiment of the invention, the metal material based on magnesium or magnesium alloys is a Class 1A, Class 1B, Class 2, Class 3, or Class 6 secondary magnesium material, preferably a Class 3 secondary magnesium material. Preferably, the secondary magnesium material comprises 60 at. % to 98.5 at. % Mg, 1 at. % to 40 at. % Al, and optionally further metal impurities, such as rare earth metals, in amounts of up to 2 at. %, preferably up to 1 at. % each. Other metal elements which may be present in the secondary magnesium material include nickel, chromium, zinc, zirconium, each in amounts of up to 1 at. %. The secondary magnesium material may contain grease and/or oil impurities. In a still further embodiment of the invention, the secondary magnesium material comprises 85 at. % to 95 at. % Mg, 4 at. % to 14 at. % Al, and optionally further metal impurities such as rare earth metals, in amounts of up to 2 at. % in total.

In an embodiment of the invention, the secondary magnesium material is provided in the form of metal chips or metal flakes. Preferably, the metal chips or metal flakes have a mean diameter of between 1 mm and 5 mm. In a still further embodiment, the secondary magnesium material is used without any pre-washing. In a further embodiment of the invention, the secondary magnesium material is milled prior to milling together with the metal borate, preferably in an inert gas atmosphere.

It has surprisingly been found that the use of secondary magnesium material is more effective in producing metal borates than pure magnesium, and that the use of Class 2 or Class 3 secondary magnesium material is more effective in producing metal borates than the use of Class 1A or Class 1B secondary magnesium material. For economical and effectiveness, the use of Class 3 secondary magnesium material is therefore preferred.

In a still further embodiment of the invention, the milling is carried out in a ball mill. The size of the balls in the ball mill is not critical. For reasons of ease of handling and availability, steel balls of 1 cm in diameter were preferably used. The milling can be carried out at any temperature, but is preferably carried out at ambient temperature, (20° C. to 23° C.). In a still further embodiment of the invention, the weight ratio of balls to powder ranges from 5:1 to 50:1, preferably from 10:1 to 20:1. In a still further embodiment of the invention, the time for ball milling ranges from 5 hours to 36 hours, preferably from 16 hours to 24 hours.

In a still further embodiment of the invention, the hydrogen atmosphere and the inert gas atmosphere, respectively, contains less than 10 ppm $O_2$ and less than 10 ppm $H_2O$ to avoid oxidation of the starting material. The inert gas atmosphere is preferably a nitrogen atmosphere or an argon atmosphere.

Without wishing to be bound to any theory, it seems that during ball milling of the anhydrous metal borate salt in the presence of a metal material based on magnesium or magnesium alloys in an hydrogen atmosphere no intermediate $MgH_2$ is formed, especially when Class 2 or Class 3 secondary magnesium material is used. Rather a ionic mechanism is postulated wherein the impurities in the secondary magnesium material seem to act as catalyst. This is suggested by the alternative embodiment wherein conversion of a hydrous metal borate salt in the presence of a metal material based on magnesium or magnesium alloys in a inert gas atmosphere takes place without the addition of hydrogen gas or $MgH_2$. The hydrogen source in this is the water of crystallization of the hydrous metal borate salt.

EXAMPLES

Example 1

$NaBH_4$ was produced from $NaBO_2.4H_2O$, by first drying $NaBO_2.4H_2O$ in a thermal treatment of at 350° C. for 24 hours. Class 3 secondary magnesium material was milled in argon gas atmosphere using an industrial mill device. The dried $NaBO_2$ and the milled secondary magnesium material was introduced into a ball mill containing steel balls of 1 cm in diameter in a ball to powder ratio of 10:1 in an inert gas atmosphere. Hydrogen gas was introduced, and the milling took place at ambient temperature for 24 hours. During and after the milling process the products were characterized via XRD and NMR techniques to assess the conversion into $NaBH_4$. The conversion ratio of $NaBO_2$ to $NaBH_4$ was found to be higher than 99.5%. After the milling process the obtained material was stored in controlled atmosphere (<10 ppm $O_2$ and $H_2O$).

Example 2

Anhydrous $LiBH_4$ was obtained from Sigma Aldrich in 99.5% purity. Class 3 secondary magnesium material was milled in argon gas atmosphere using an industrial mill device. The anhydrous $LiBO_2$ and the milled secondary magnesium material was introduced into a ball mill containing steel balls of 1 cm in diameter in a ball to powder ratio of 10:1 in an inert gas atmosphere. Hydrogen gas was introduced, and the milling took place at ambient temperature for 24 hours. During and after the milling process the products were characterized via XRD and NMR techniques to assess the conversion into $LiBH_4$. The conversion ratio of $LiBO_2$ to $LiBH_4$ was found to be higher than 99.5%. After the milling process the obtained material was stored in controlled atmosphere (<10 ppm $O_2$ and $H_2O$).

Example 3

$NaBO_2 \cdot 4H_2O$ was obtained from Sigma Aldrich in 99.5% purity. Class 3 secondary magnesium material was milled in argon gas atmosphere using an industrial mill device. The anhydrous $NaBO_2 \cdot 4H_2O$ and the milled secondary magnesium material was introduced into a ball mill containing steel balls of 1 cm in diameter in a ball to powder ratio of 10:1 in an argon gas atmosphere. The components were milled in argon atmosphere at ambient temperature for 24 hours. During and after the milling process the products were characterized via XRD and NMR techniques to assess the conversion into $LiBH_4$. The conversion ratio of $LiBO_2$ to $LiBH_4$ was found to be higher than 99.5%. After the milling process the obtained material was stored in controlled atmosphere (<10 ppm $O_2$ and $H_2O$).

The invention claimed is:

1. A method for the production of metal tetrahydridoborate salts comprising the steps of providing an anhydrous metal borate salt and milling the anhydrous metal borate salt in the presence of a metal material based on magnesium or magnesium alloys in a hydrogen atmosphere at a temperature and for a time sufficient to produce the metal tetrahydridoborate salt, wherein the metal material based on magnesium or magnesium alloys is a Class 1A secondary magnesium material, a Class 1B secondary magnesium material, a Class 2 secondary magnesium material, a Class 3 secondary magnesium material, or a Class 6 secondary magnesium material.

2. The method of claim 1, wherein the anhydrous metal borate salt is an anhydrous alkaline metal or alkaline earth metal borate salt.

3. The method of claim 2, wherein the anhydrous metal borate salt is an anhydrous sodium borate salt or an anhydrous lithium borate salt.

4. The method of claim 1, which produces a metal tetrahydroborate salt.

5. The method of claim 1, wherein the metal material based on magnesium or magnesium alloys comprises 60 at. % to 98.5 at. % Mg, 1 at. % to 40 at. % Al, and optionally further metal impurities, in amounts of up to 2 at. % each.

6. The method of claim 5, wherein the metal material based on magnesium or magnesium alloys comprises 85 at. % to 95 at. % Mg, 4 at. % to 14 at. % Al, and optionally further metal impurities, in amounts of up to 2 at. % in total.

7. The method of claim 1, wherein the milling is carried out in a ball mill.

8. The method of claim 1, wherein the milling is carried out at a temperature between 10° C. and 100° C.

9. The method of claim 1, wherein the milling is carried out for a time period ranging from 5 hours to 36 hours.

10. The method of claim 9, wherein the milling is carried out for a time period ranging from 16 hours to 24 hours.

11. The method of claim 1, wherein the hydrogen atmosphere and an inert gas atmosphere, respectively, include less than 10 ppm $O_2$ and less than 10 ppm $H_2O$.

12. A method for the production of metal tetrahydridoborate salts comprising the steps of providing an hydrated metal borate salt and milling the hydrated metal borate salt in the presence of a metal material based on magnesium or magnesium alloys in an inert gas atmosphere at a temperature and for a time sufficient to produce the metal tetrahydridoborate salts, wherein the metal material based on magnesium or magnesium alloys is a Class 1A secondary magnesium material, a Class 1B secondary magnesium material, a Class 2 secondary magnesium material, a Class 3 secondary magnesium material, or a Class 6 secondary magnesium material.

13. The method of claim 12, wherein the hydrated metal borate salt is a hydrated alkaline metal or alkaline earth metal borate salt.

14. The method of claim 13, wherein the hydrated metal borate salt is a hydrated sodium borate salt or a hydrated lithium borate salt.

15. The method of claim 12, which produces a metal tetrahydroborate salt.

16. The method of claim 12, wherein the metal material based on magnesium or magnesium alloys comprises 60 at. % to 98.5 at. % Mg, 1 at. % to 40 at. % Al, and optionally further metal impurities in amounts of up to 2 at. % each.

17. The method of claim 16, wherein the metal material based on magnesium or magnesium alloys comprises 85 at. % to 95 at. % Mg, 4 at. % to 14 at. % Al, and optionally further metal impurities such as rare earth metals, in amounts of up to 2 at. % in total.

18. The method of claim 12, where in a hydrogen atmosphere and the inert gas atmosphere, respectively, include less than 10 ppm $O_2$ and less than 10 ppm $H_2O$.

* * * * *